(12) United States Patent
Wynn-Grayson

(10) Patent No.: US 11,297,766 B1
(45) Date of Patent: Apr. 12, 2022

(54) STANDING MOTORIZED LAWN MOWER WITH SULKY AND STEERING COLUMN

(71) Applicant: Stefanie Wynn-Grayson, Herndon, VA (US)

(72) Inventor: Stefanie Wynn-Grayson, Herndon, VA (US)

( * ) Notice: Subject to any disclaimer, the term of this patent is extended or adjusted under 35 U.S.C. 154(b) by 274 days.

(21) Appl. No.: 16/695,364

(22) Filed: Nov. 26, 2019

(51) Int. Cl.
| | |
|---|---|
| *A01D 34/00* | (2006.01) |
| *A01D 34/81* | (2006.01) |
| *A01D 34/84* | (2006.01) |
| *A01D 34/82* | (2006.01) |
| *A01D 34/90* | (2006.01) |
| *A01B 63/00* | (2006.01) |
| *A01D 34/416* | (2006.01) |
| *A01D 75/00* | (2006.01) |
| *A01D 101/00* | (2006.01) |

(52) U.S. Cl.
CPC ............ *A01D 34/90* (2013.01); *A01B 63/008* (2013.01); *A01D 34/001* (2013.01); *A01D 34/006* (2013.01); *A01D 34/416* (2013.01); *A01D 75/00* (2013.01); *A01D 2034/907* (2013.01); *A01D 2101/00* (2013.01)

(58) Field of Classification Search
CPC .............. A01B 63/008; A01D 2101/00; A01D 2034/907; A01D 75/00; A01D 34/46; A01D 34/001; A01D 34/006; A01D 34/416; A01D 34/67
See application file for complete search history.

(56) References Cited

U.S. PATENT DOCUMENTS

| | | | | |
|---|---|---|---|---|
| 3,729,908 | A * | 5/1973 | Miner | A01D 34/81 56/16.7 |
| 4,828,282 | A * | 5/1989 | Pinto | A01D 34/001 280/32.7 |
| 4,878,339 | A | 11/1989 | Marier | |
| 5,388,850 | A * | 2/1995 | Simone | A01D 34/001 180/19.1 |
| D359,291 | S * | 6/1995 | Tihonovich | D15/14 |
| 5,697,623 | A * | 12/1997 | Bermes | A01D 34/001 172/433 |
| 5,813,679 | A * | 9/1998 | Hobrath | A01D 34/001 172/433 |
| 5,893,817 | A | 4/1999 | Morgan | |
| 5,909,887 | A * | 6/1999 | Hobrath | A01D 34/001 280/32.7 |
| 6,490,849 | B1 | 12/2002 | Scag | |
| 6,560,952 | B2 | 5/2003 | Velke | |
| 6,601,374 | B2 | 8/2003 | Smith | |
| 6,625,965 | B2 | 9/2003 | Wright | |
| 6,637,760 | B1 * | 10/2003 | Carman | A01D 34/001 280/32.7 |

(Continued)

*Primary Examiner* — Adam J Behrens
(74) *Attorney, Agent, or Firm* — Kyle A. Fletcher, Esq.

(57) ABSTRACT

The standing motorized lawn mower comprises a mower and a sulky. The standing motorized lawn mower may be adapted to allow a user to stand on the sulky as the sulky is pulled by the mower. The mower may be steered using a steering column. A touch sensitive display located on the steering column may be adapted to provide functional control of the standing motorized lawn mower to the user. The steering column may provide a phone holder, a cup holder, and an earphone jack. One or more string trimmers located on the front of the mower may trim grass at the edge of a mowing area.

19 Claims, 8 Drawing Sheets

(56) References Cited

U.S. PATENT DOCUMENTS

| | | | | |
|---|---|---|---|---|
| 6,892,518 | B1* | 5/2005 | Bares | A01D 34/001 56/10.4 |
| 7,367,173 | B2 | 5/2008 | Daly | |
| 9,010,078 | B2* | 4/2015 | MacDonald | A01D 43/16 56/12.7 |
| 2005/0097875 | A1* | 5/2005 | Haeufele | A01D 34/824 56/17.5 |
| 2005/0126146 | A1* | 6/2005 | Velke | A01D 34/82 56/16.7 |
| 2005/0183409 | A1* | 8/2005 | Barrier | A01D 34/824 56/11.9 |
| 2006/0076152 | A1* | 4/2006 | Haufele | A01D 34/824 172/329 |
| 2013/0125522 | A1* | 5/2013 | Williams | A01D 42/02 56/16.9 |
| 2015/0006025 | A1* | 1/2015 | Rhoades | H04M 1/725 701/33.2 |
| 2015/0040529 | A1* | 2/2015 | Standridge | A01D 34/84 56/13.7 |
| 2016/0177844 | A1* | 6/2016 | Fuentes Utrilla | A01B 45/00 701/110 |
| 2018/0077861 | A1* | 3/2018 | Lego | A01D 34/4165 |
| 2019/0141889 | A1* | 5/2019 | Fisher | A01D 69/03 56/10.7 |
| 2019/0166758 | A1* | 6/2019 | Phillip | B62D 51/02 |
| 2020/0029502 | A1* | 1/2020 | Hultgren | B65G 33/14 |
| 2020/0205338 | A1* | 7/2020 | Zeiler | B62D 21/11 |
| 2020/0209052 | A1* | 7/2020 | Asahara | A01D 34/82 |
| 2020/0375097 | A1* | 12/2020 | Coleman | A01D 34/6806 |

\* cited by examiner

STANDING MOTORIZED LAWN MOWER WITH SULKY AND STEERING COLUMN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lawn care, more specifically, a standing motorized lawn mower.

SUMMARY OF INVENTION

The standing motorized lawn mower comprises a mower and a sulky. The standing motorized lawn mower may be adapted to allow a user to stand on the sulky as the sulky is pulled by the mower. The mower may be steered using a steering column. A touch sensitive display located on the steering column may be adapted to provide functional control of the standing motorized lawn mower to the user. The steering column may provide a phone holder, a cup holder, and an earphone jack. One or more string trimmers located on the front of the mower may trim grass at the edge of a mowing area.

An object of the invention is to mow a lawn.

Another object of the invention is to provide a sulky for the user of the mower to stand on while operating the mower.

A further object of the invention is to provide one or more string trimmers at the front of the mower.

Yet another object of the invention is to provide a cup holder, a phone holder, an earphone jack, and a touch sensitive display on the handle bars of the mower.

These together with additional objects, features and advantages of the standing motorized lawn mower will be readily apparent to those of ordinary skill in the art upon reading the following detailed description of the presently preferred, but nonetheless illustrative, embodiments when taken in conjunction with the accompanying drawings.

In this respect, before explaining the current embodiments of the standing motorized lawn mower in detail, it is to be understood that the standing motorized lawn mower is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the standing motorized lawn mower.

It is therefore important that the claims be regarded as including such equivalent construction insofar as they do not depart from the spirit and scope of the standing motorized lawn mower. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
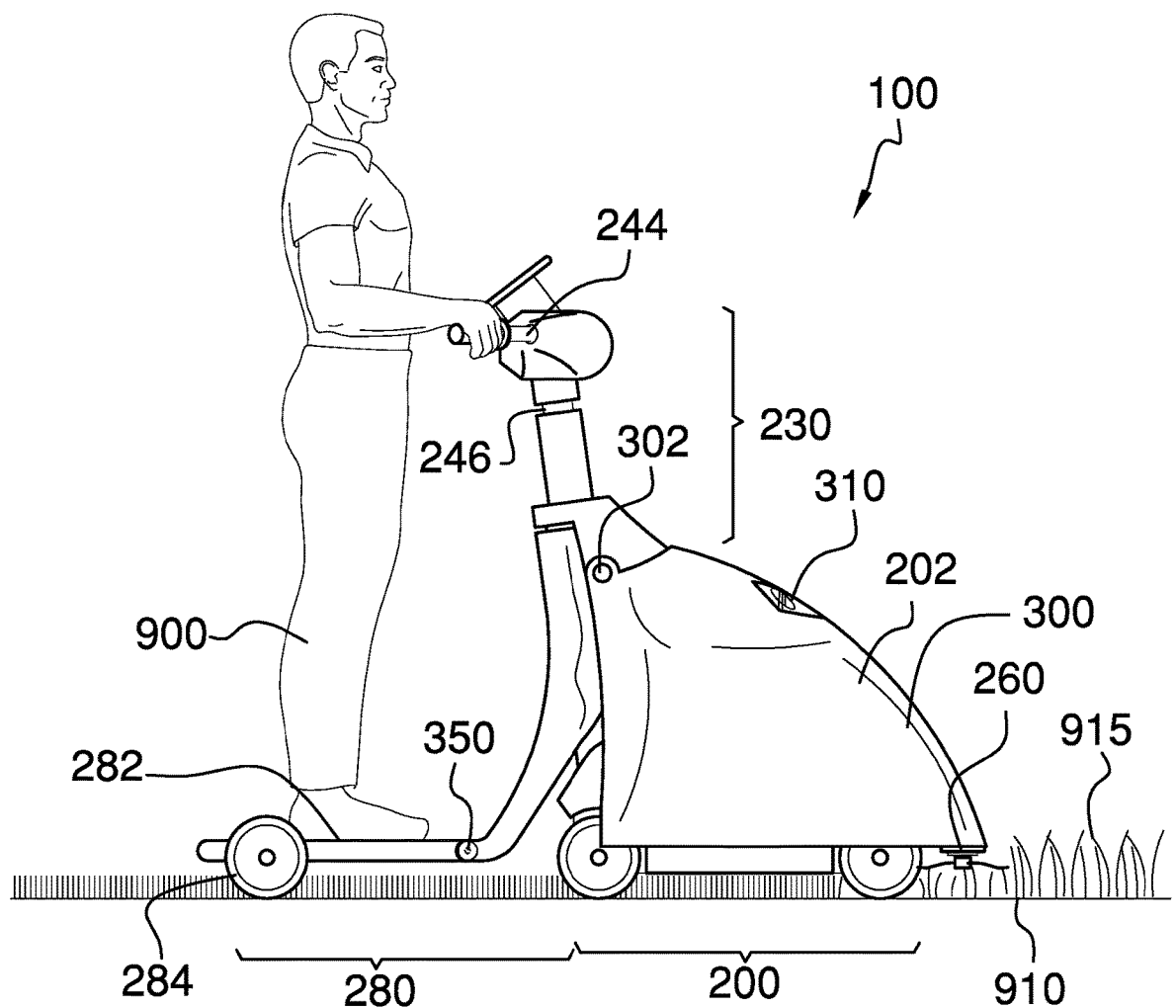
FIG. 1 is a side view of an embodiment of the disclosure.
Figure 2:
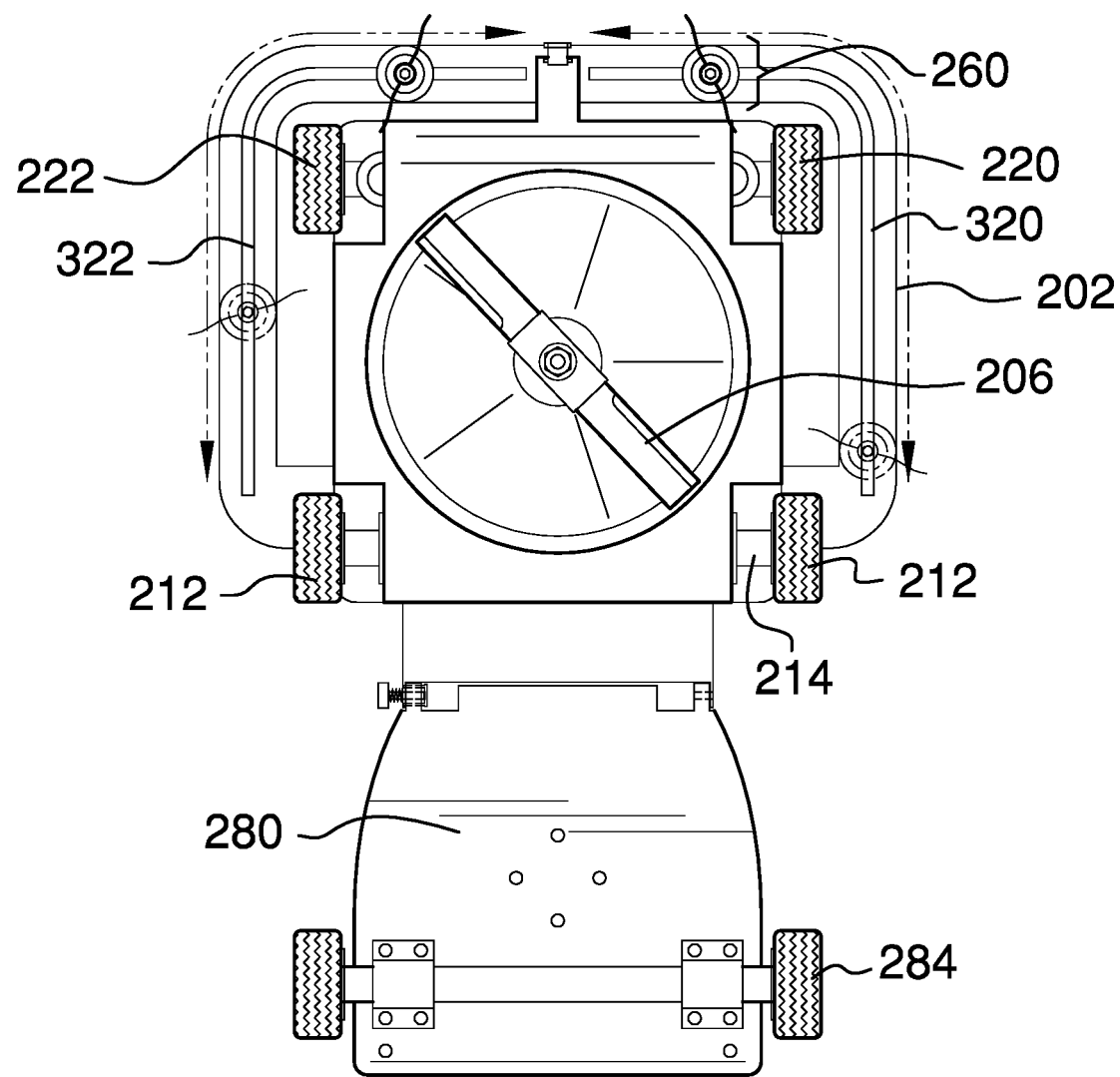
FIG. 2 is a bottom view of an embodiment of the disclosure.
Figure 3:
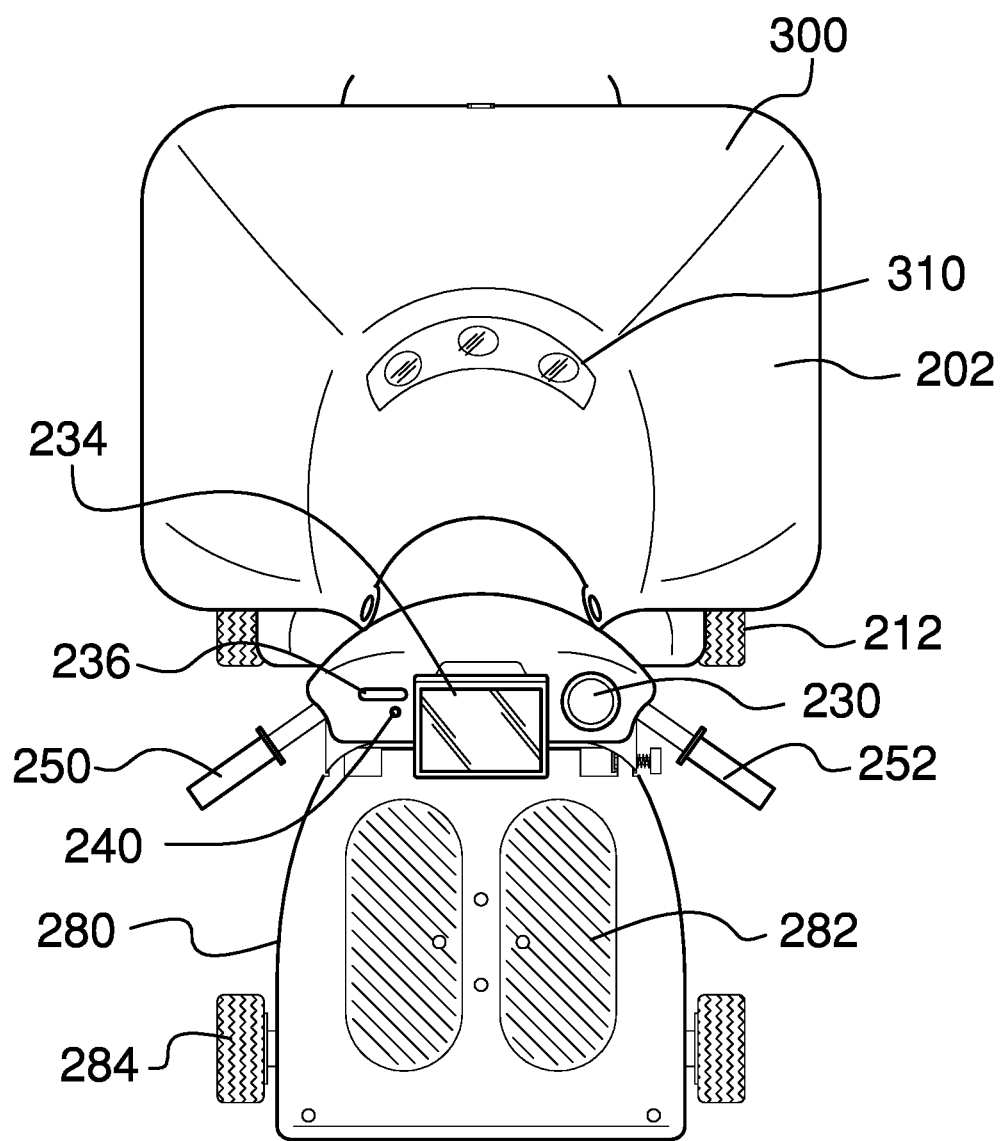
FIG. 3 is a top view of an embodiment of the disclosure.
Figure 4:
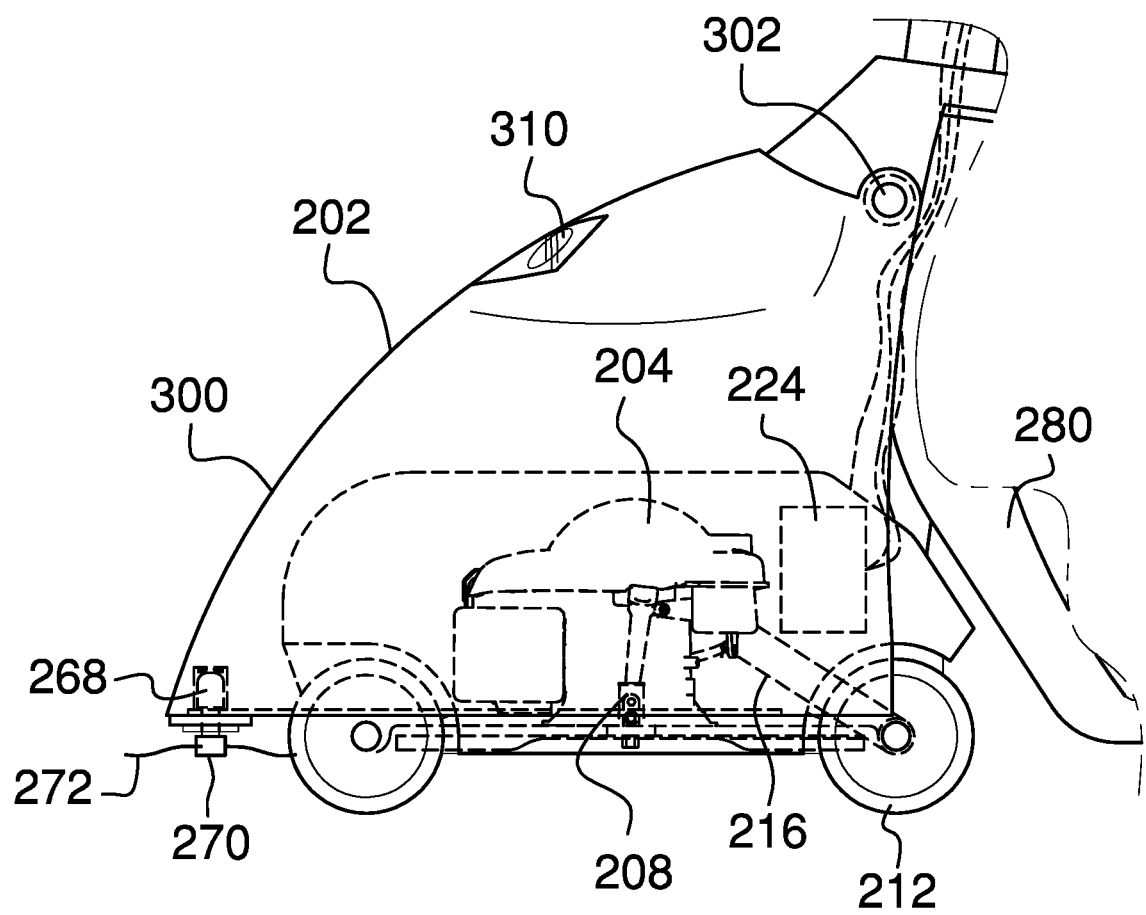
FIG. 4 is a detail view of an embodiment of the disclosure illustrating the mower.
Figure 5:
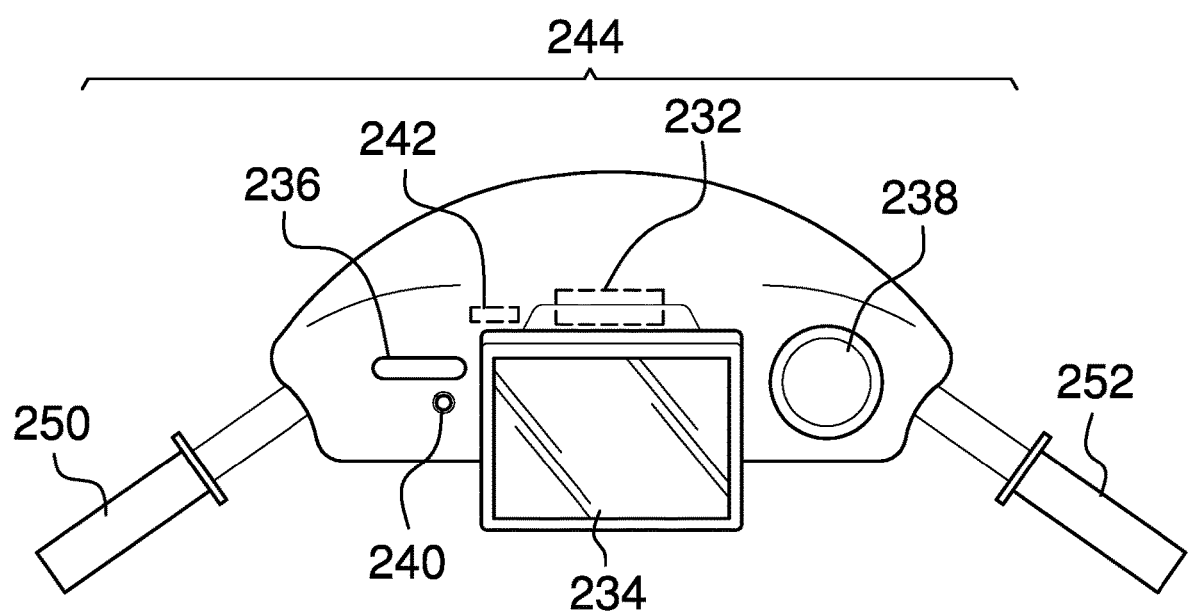
FIG. 5 is a detail view of an embodiment of the disclosure illustrating the handlebars.
Figure 6:
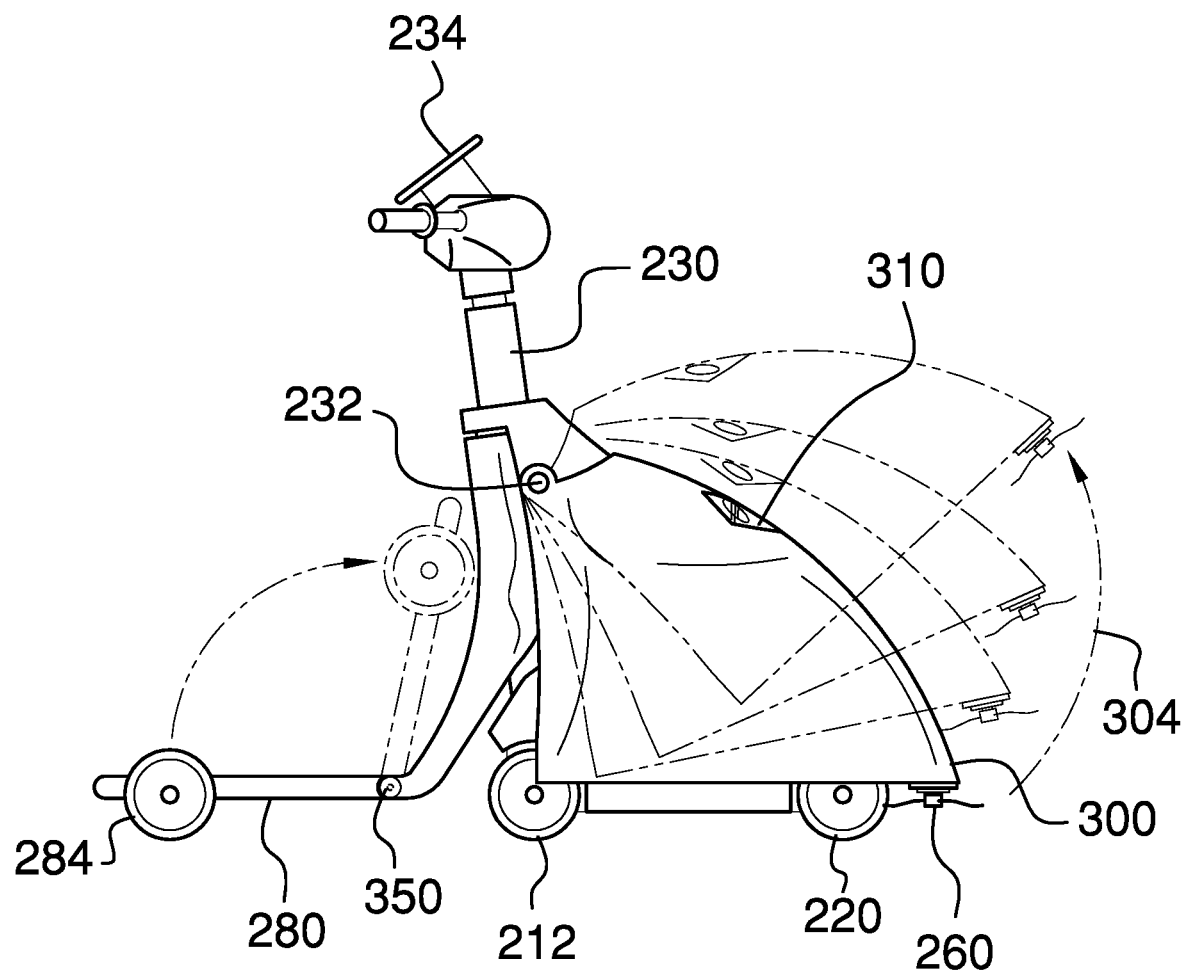
FIG. 6 is a detail view of an embodiment of the disclosure illustrating the pivoting off the hood and the operator platform.
Figure 7:
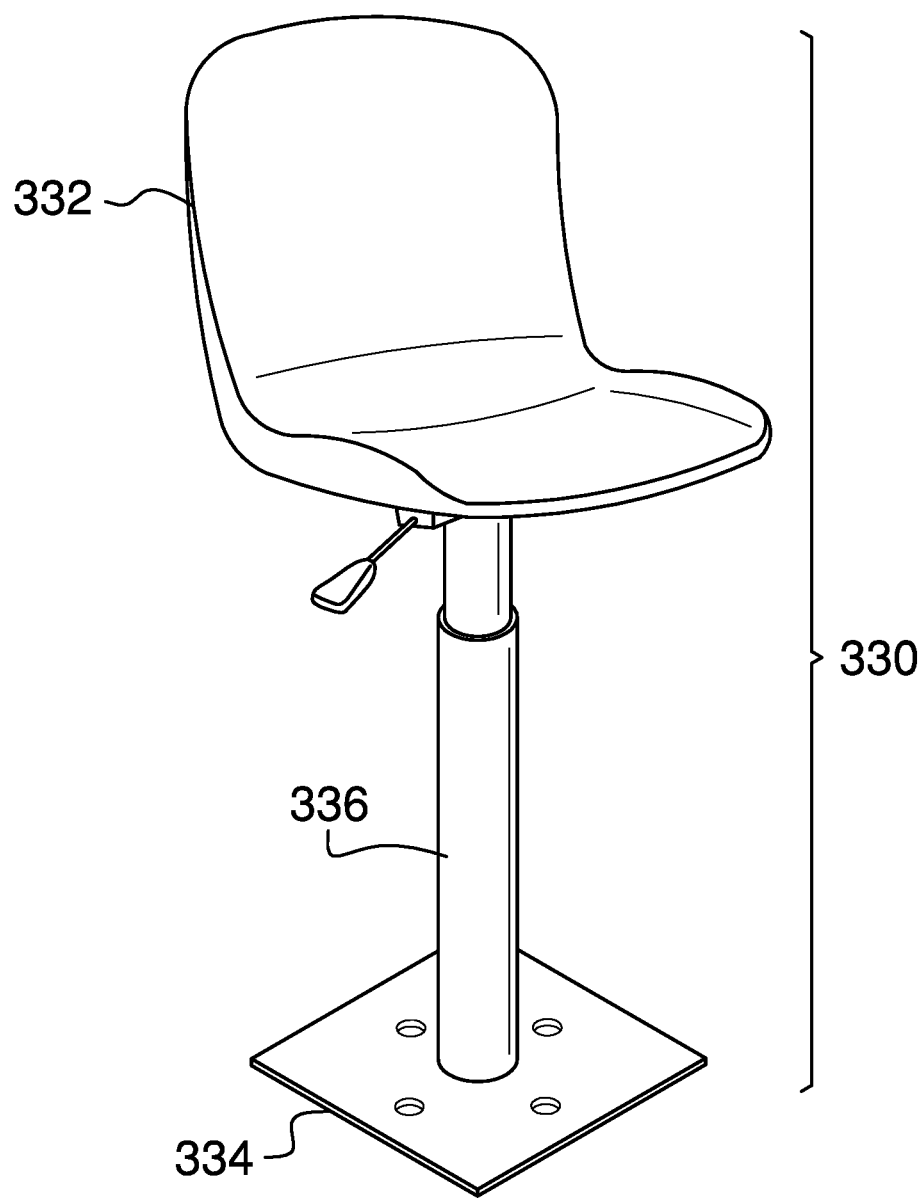
FIG. 7 is a detail view of an embodiment of the disclosure illustrating operator seat.
Figure 8:
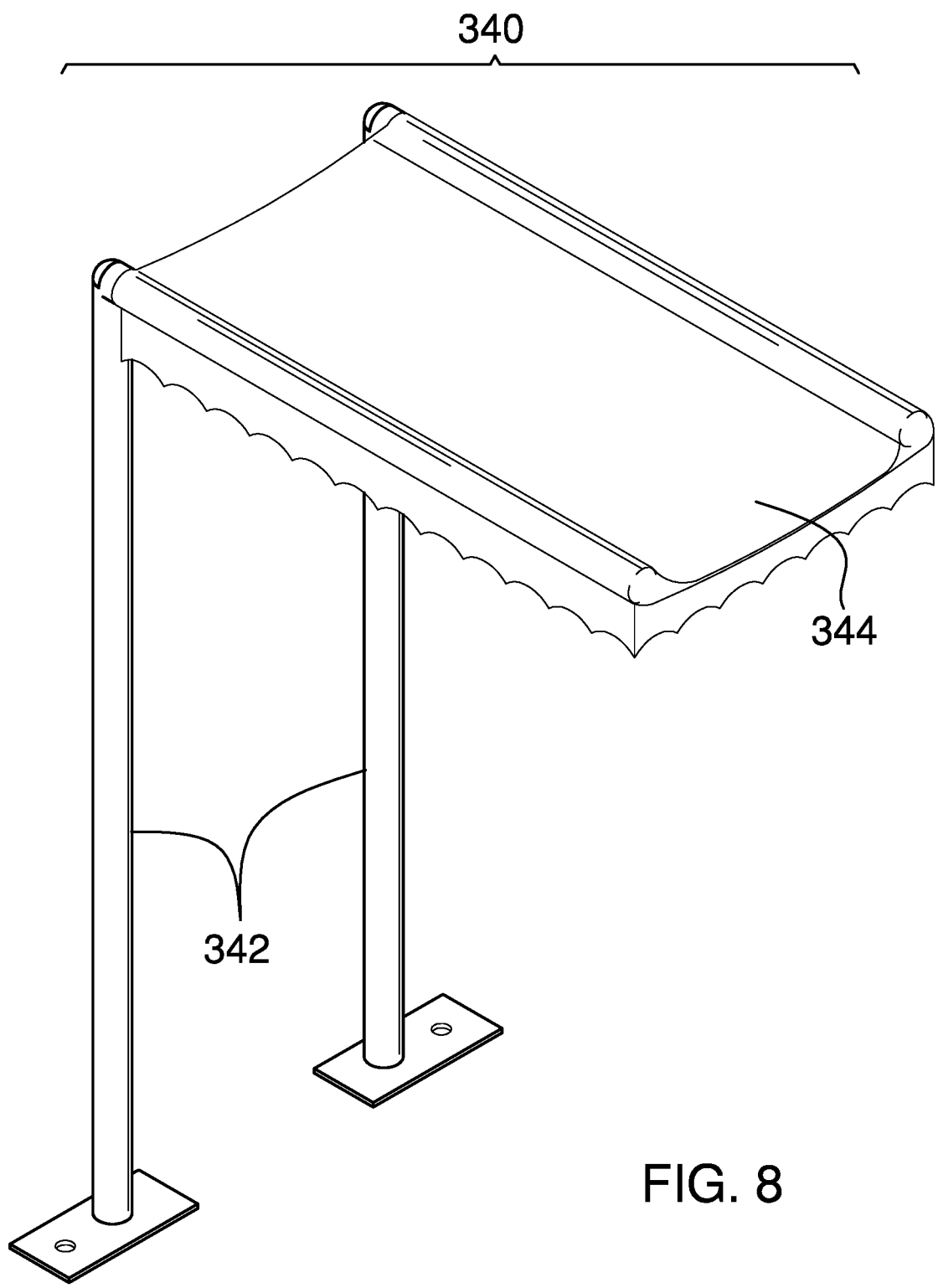
FIG. 8 is a detail view of an embodiment of the disclosure illustrating the sun shade.

Detailed reference will now be made to a first potential embodiment of the disclosure, which is illustrated in FIGS. 1 through 8.

The standing motorized lawn mower 100 (hereinafter invention) comprises a mower 200 and a sulky 280. The invention 100 may be adapted to allow a user 900 to stand on the sulky 280 as the sulky 280 is pulled by the mower 200. The mower 200 may be steered using a steering column 230. A touch sensitive display 234 located on the steering column 230 may be adapted to provide functional control of the invention 100 to the user 900. The steering column 230 may provide a phone holder 236, a cup holder 238, and an earphone jack 240. One or more string trimmers 260 located on the front of the mower 200 may trim grass 915 at the edge of a mowing area.

The mower 200 may comprise a mower body 202, a mower motor 204, a battery 224, a plurality of wheels, a mowing blade 206, the steering column 230, and a hood 300. The mower 200 may cut the grass 915 comprising a lawn 910 using the mowing blade 206 as the mower 200 passes over the lawn 910. The mower body 202 may be an enclosure for the mower motor 204 and the mowing blade 206. The plurality of wheels may be coupled to the underside of the mower body 202. The mower motor 204 may be housed within the mower body 202. The steering column 230 may be coupled to the mower body 202 at the rear of the mower body 202. The hood 300 may be a shroud covering the front of the mower 200. The hood 300 may be pivotably coupled to the steering column 230 via a hood hinge 302. The hood hinge 302 may lift the hood 300 to a hood elevation angle 304. In some embodiments, the hood 300 may comprise one or more headlights 310 that may illuminate the lawn 910 in front of the mower 200 when the one or more headlights 310 is on.

The mower motor 204 may be an engine that turns the mowing blade 206 and drives at least one of the plurality of wheels. As a non-limiting example, the mower motor 204 may be an internal combustion engine. The battery 224 may comprise one or more energy-storage devices. The battery 224 may be a source of electrical energy to operate a processor 232, the touch sensitive display 234, and a transceiver 242. The battery 224 may be replaceable or rechargeable.

The plurality of wheels may comprise a pair of rear wheels 212, a left front wheel 220, and a right front wheel 222. The pair of rear wheels 212 may be coupled to a rear axle 214 that is horizontally-oriented and runs laterally across the bottom of the mower body 202 such that the pair of rear wheels 212 may rotate as the mower 200 moves forward or backwards. The rear axle 214 may be mechanically coupled to the mower motor 204 when a rear drive 216 is engaged such that the mower motor 204 may cause rotation of the pair of rear wheels 212.

The left front wheel 220 and the right front wheel 222 may be pivotably coupled to the left front corner of the mower body 202 and the right front corner of the mower body 202, respectively. The left front wheel 220 and the right front wheel 222 may pivot about vertically-oriented axes such that pivoting of the left front wheel 220 and the right front wheel 222 may steer the mower body 202.

The mowing blade 206 may be a horizontally-oriented armature located under the mower body 202. The center of the mowing blade 206 may be coupled to a blade drive 208 such that the mower motor 204 may cause rotation of the mowing blade 206 within a horizontal plane when the blade drive 208 is engaged. The mowing blade 206 may comprise a sharpened edge on each side of the center of the mowing blade 206 oriented such that the sharpened edges face forward when the blade drive 208 is engaged and the mowing blade 206 is rotating.

The steering column 230 may comprise handle bars 244 and a steering shaft 246. The handle bars 244 may be operable to steer the left front wheel 220 and the right front wheel 222 by rotating the steering shaft 246. The steering shaft 246 may be coupled, either directly or indirectly, to the left front wheel 220 and to the right front wheel 222 such that rotation of the steering shaft 246 by the handle bars 244 may cause the left front wheel 220 and the right front wheel 222 to pivot.

The handle bars 244 may comprise a left hand grip 250, a right hand grip 252, the processor 232, the touch sensitive display 234, the transceiver 242, the phone holder 236, the cup holder 238, and the earphone jack 240. The left hand grip 250 may project laterally from the left side of the handle bars 244. The right hand grip 252 may project laterally from the right side of the handle bars 244. The left hand grip 250 and the right hand grip 252 may be adapted to held by the user 900 while the user 900 is riding the invention 100. The left hand grip 250 and the right hand grip 252 may be operable to rotate the handle bars 244 by pulling the left hand grip 250 or the right hand grip 252 towards the rear of the invention 100.

The processor 232 may be a computer processor that incorporates the functions of a central processing unit in the form of one or more integrated circuits. The processor 232 may be a multipurpose, clock driven, register based, digital-integrated circuit. The processor 232 may accept binary data as input, process the binary data according to instructions stored in a memory, and provide results as output. The processor 232 may contain both combinational logic and sequential digital logic. The processor 232 may operate on numbers and symbols represented in the binary numeral system. The processor 232 may control the operation of the invention 100. As non-limiting examples, based upon inputs received from the tough sensitive display 234 or subsystems of the mower 200, the processor 232 may engage and disengage the blade drive 208, the rear drive 216, and the one or more string trimmers 260. The processor 232 enable and disable operation of the mower motor 204 and may control the rotational speed of the mower motor 204. The processor 232 may determine the hood elevation angle 304. The processor 232 may control the on/off state of the one or more headlights 310. The touch sensitive display 234 may be adapted to display operational status to the user 900 and to notify the processor 232 of input provided by the user 900 touching the touch sensitive display 234.

As non-limiting examples, the processor 232 may display icons, text, graphical user interface controls, touch targets, or hyperlinks representing subsystems or operational parameters. The processor 232 may interpret interactions with the touch sensitive display 234 such as touches, dragging, tapping, or double tapping as input to modify the operation of the invention 100.

As detailed non-limiting examples, the processor 232 may display a power icon on the touch sensitive display 234 which the user 900 may tap to start or stop the mower motor 204. The processor 232 may display a slider graphical user interface which the user 900 may slide a finger over to increase or decrease the speed of the mower motor 204. In some embodiments, the user 900 may interact with other graphical controls on the touch sensitive display 234 to start and stop the one or more string trimmers 260, adjust the height of the mowing blade 206, monitor fuel and battery charge levels, change a music selection, or adjust volume levels.

The transceiver 242 may provide a wireless interconnection between the processor 232 and one or more subsystems of the invention 100 or between the processor 232 and a smart phone. The transceiver 242 may provide one or more channels of communication using proprietary and/or industry standard protocols. As non-limiting examples, the one or more communication channels may utilize Bluetooth, BLE, WiFi, NFC, ZigBee, Z-Wave, 6LoWPAN, cellular, or other short-range, low power protocols.

The phone holder 236 may be a rectangular depression in the top surface of the handle bars 244 that is adapted to hold the smart phone. The cup holder 238 may be a circular depression in the top surface of the handle bars 244 that is adapted to hold a drinking cup. The earphone jack 240 may be an electrical jack that is adapted to accept a plug from an earphone. The earphone jack 240 may be electrically coupled to the processor 232 such that an audio signal from the processor 232 may be passed to the earphone. As a non-limiting example, the music program may be received by the processor 232 from the smart phone via the transceiver 242.

The sulky 280 may be coupled the mower 200, either directly or indirectly, and may be pulled by the mower 200. The sulky 280 may roll over the lawn 910 using a sulky wheels 284. The sulky 280 may be adapted for the user 900 to stand on an operator platform 282. In some embodiments, the sulky 280 may be pivotably coupled to the steering column 230 such that movement of the mower 200 pulls the sulky 280 via the steering column 230. In some embodiments, the operator platform 282 may pivot upwards at a platform hinge 350 such that the footprint of the invention 100 is reduced for storage. The operator platform 282 may latch into the up position for safety. The latch may be released manually to lower the operator platform 282 for use.

An individual string trimmer selected from the one or more string trimmers 260 may comprise a trimmer motor 268, a string spool 270, a trimming string 272. The string spool 270 may be coupled to the trimmer motor 268 such that rotation of the trimmer motor 268 causes rotation of the string spool 270. The trimming string 272 may be wrapped around the string spool 270 such that at least one end of the trimming string 272 is free to cut as the string spool 270 rotates. Additional length of the trimming string 272 may be fed out from the string spool 270 as the trimming string 272 wears during use. In some embodiments, the trimmer motor 268 energization and de-energization of the trimmer motor 268 may be controlled by wireless communications between the trimmer motor 268 and the processor 232 via the transceiver 242.

In some embodiments, the one or more string trimmers 260 may be coupled to a left trimmer track 320 and a right trimmer track 322. The left trimmer track 320 and the right trimmer track 322 may be coupled to the underside of the hood 300 at the front of the hood 300. The one or more string trimmers 260 may be repositioned along the left trimmer track 320 and the right trimmer track 322 under control of the processor 232 to trim in front of and along the side of the mower 200. The height of the one or more string trimmers 260 may be varied by changing the hood elevation angle 304.

The invention 100 may further comprise an operator seat 330. The operator seat 330 may comprise a seat 332, a seat base 334, and a seat post 336. The operator seat 330 may be attached to the operator platform 282 by coupling the seat base 334 to the operator platform 282 via seat mounting hardware. The operator seat 330 may be decoupled and removed from the operator platform 282 for standing operation. The operator seat 330 may be adapted for the user 900 to sit upon when the operator seat 330 is coupled to the operator platform 282. The height of the seat 332 may be varied by changing the height of the seat post 336.

The invention 100 may further comprise a sun shade 340. The sun shade 340 may comprise a shade frame 342 and a shade panel 344. The shade panel 344 may be adapted to provide shade for the user 900 while the user 900 operates the invention 100. The shade frame 342 may be adapted to support the shade panel 344 above the user 900. The sun shade 340 may be attached to the operator platform 282 by coupling the shade frame 342 to the operator platform 282 via shade mounting hardware. The sun shade 340 may be decoupled and removed from the operator platform 282 by removing the shade mounting hardware.

In use, the user 900 steps onto the sulky 280 and uses the touch sensitive display 234 to start the mower motor 204. The user 900 may engage the rear drive 216 to move the mower 200 and may control the speed of the mower 200 via the touch sensitive display 234. The user 900 may engage the blade drive 208 to cause rotation of the mowing blade 206 to mow the lawn 910. The user 900 may engage the one or more string trimmers 260 to trim along borders and may change the height of the one or more string trimmers 260 by changing the hood elevation angle 304. On sunny days, the user 900 may couple the sun shade 340 to the operator platform 282 for relief from the sun. The user 900 may couple the operator seat 330 to the operator platform 282 if they do not desire to stand while mowing.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "axle" is a cylindrical shaft that is inserted through the center of an object such that the center axis of the object and the center axis of the axle are aligned and the object can rotate using the axle as an axis of rotation.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "blade" is a term that is used to describe a wide and flat structure or portion of a larger structure. Non-limiting examples of object which are or which comprise blades may include a knife, a propeller, a shovel, an oar, or a cutting edge of a tool or razor.

As used in this disclosure, "Bluetooth" is a standardized communication protocol that is used to wirelessly interconnect electronic devices. Bluetooth® is a registered trademark of Bluetooth SIG.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, the words "couple", "couples", "coupled" or "coupling", refer to connecting, either directly or indirectly, and does not necessarily imply a mechanical connection.

As used herein, the words "data" and "information" are used interchangeably to refer to raw, unprocessed facts and to facts that have been processed, structured, organized, or presented in a context that makes the facts useful.

As used in this disclosure, a "display" is a surface upon which is presented an image, potentially including, but not limited to, graphic images and text, that is interpretable by an individual viewing the image. When used as a verb, "display" is defined as presenting such an image.

As used in this disclosure, an "earphone" refers to a device that converts electrical signals into audible sounds. An earphone may be worn in contact with or in proximity to the ear.

As used herein, "energize" and/or "energization" refer to the application of an electrical potential to a system or subsystem.

As used in this disclosure, an "engine" is a device with moving parts that is used to convert energy into rotational or linear motion.

As used here, "footprint" refers to a vertical, downward projection of an object onto the surface that supports the object. The portion of the supporting surface that is within the footprint is, by definition, underneath the object.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "handle" is an object by which a tool, object, or door is held or manipulated with the hand.

As used in this disclosure, a "hinge" is a device that permits the turning, rotating, or pivoting of a first object relative to a second object.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, an "internal combustion engine" is an engine powered by burning fuel within the engine.

As used in this disclosure, a "jack" is a port that is designed to receive a plug in order to make an electrical connection.

As used in this disclosure, a "latch" is a fastening or locking mechanism. The use of the term latch may imply the insertion of an object into a notch or cavity. The act of latching may involve a linear, pivoting, or rotating motion.

As used in this disclosure, the word "lateral" refers to the sides of an object or movement towards a side. Lateral directions are generally perpendicular to longitudinal directions. "Laterally" refers to movement in a lateral direction.

As used herein, "mounting hardware" refers to mechanical devices that are used to attach one object to another, including devices whose only purpose is to improve aesthetics. As non-limiting examples, mounting hardware may include screws, nuts, bolts, washers, crossbars, hooks, collars, nipples, standoffs, knobs, caps, plates, rails, and brackets.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure, a "plug" is an electrical termination that electrically connects a first electrical circuit to a second electrical circuit or a source of electricity.

As used herein, the terms "processor", "central processor", "central processing unit", "CPU", or "microprocessor" refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, the term "shaft" is used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "spool" is a cylindrical device upon which a flexible material, including but not limited to a rope, a cable, a yarn, a cord, a sheet of fabric, or a tape, can be wound. Depending on context, a spool may also comprise the flexible material stored upon the spool.

As used in this disclosure, a "track" is a device that is used to control the path of motion of an object in at least one dimension.

As used in this disclosure, a "transceiver" is a device that is used to transmit and/or receive signals. The signals may be audible, optical, or RF in nature.

As used in this disclosure, "vertical" refers to a direction that is parallel to the local force of gravity. Unless specifically noted in this disclosure, the vertical direction is always perpendicular to horizontal.

As used in this disclosure, a "wheel" is a circular object that revolves around an axle or an axis and is fixed below an object to enable it to move easily over the ground.

As used in this disclosure, "WiFi" refers to the physical implementation of a collection of wireless electronic communication standards commonly referred to as IEEE 802.11x and used for wireless communication between devices.

As used in this disclosure, "wireless" is an adjective that is used to describe a communication channel that does not require the use of physical cabling.

With respect to the above description, it is to be realized that the optimum dimensional relationship for the various components of the invention, described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A standing motorized lawn mower comprising:
a mower and a sulky;
wherein the standing motorized lawn mower is adapted to allow a user to stand on the sulky as the sulky is pulled by the mower;

wherein the mower is steered using a steering column;
wherein a touch sensitive display located on the steering column is adapted to provide functional control of the standing motorized lawn mower to the user;
wherein the steering column provides a phone holder, a cup holder, and an earphone jack;
wherein one or more string trimmers located on a front of the mower trim grass at an edge of a mowing area;
wherein the mower comprises a mower body, a mower motor, a battery, a plurality of wheels, a mowing blade, the steering column, and a hood;
wherein the mower cuts a lawn using the mowing blade as the mower passes over the lawn;
wherein the mower body is an enclosure for the mower motor and the mowing blade;
wherein the plurality of wheels are coupled to an underside of the mower body;
wherein the mower motor is housed within the mower body;
wherein the steering column is coupled to the mower body at a rear of the mower body;
wherein the hood is a shroud covering the front of the mower;
wherein the hood is pivotably coupled to the steering column via a hood hinge;
wherein the hood hinge lifts the hood to a hood elevation angle.

2. The standing motorized lawn mower according to claim 1
wherein the hood comprises one or more headlights that illuminate the lawn in front of the mower when the one or more headlights are on.

3. The standing motorized lawn mower according to claim 1
wherein the mower motor is an engine that turns the mowing blade and drives at least one of the plurality of wheels;
wherein the battery comprises one or more energy-storage devices;
wherein the battery is a source of electrical energy to operate a processor, the touch sensitive display, and a transceiver;
wherein the battery is replaceable or rechargeable.

4. The standing motorized lawn mower according to claim 3
wherein the plurality of wheels comprises a pair of rear wheels, a left front wheel, and a right front wheel;
wherein the pair of rear wheels is coupled to a rear axle that is horizontally-oriented and runs laterally across a bottom of the mower body such that the pair of rear wheels rotate as the mower moves forward or backwards;
wherein the rear axle is mechanically coupled to the mower motor when a rear drive is engaged such that the mower motor causes rotation of the pair of rear wheels.

5. The standing motorized lawn mower according to claim 4
wherein the left front wheel and the right front wheel are pivotably coupled to a left front corner of the mower body and a right front corner of the mower body, respectively;
wherein the left front wheel and the right front wheel pivot about vertically-oriented axes such that pivoting of the left front wheel and the right front wheel steer the mower body.

6. The standing motorized lawn mower according to claim 5
wherein the mowing blade is a horizontally-oriented armature located under the mower body;
wherein the center of the mowing blade is coupled to a blade drive such that the mower motor causes rotation of the mowing blade within a horizontal plane when the blade drive is engaged;
wherein the mowing blade comprises a sharpened edge on each side of a center of the mowing blade oriented such that the sharpened edges face forward when the blade drive is engaged and the mowing blade is rotating.

7. The standing motorized lawn mower according to claim 6
wherein the steering column comprises handle bars and a steering shaft;
wherein the handle bars are operable to steer the left front wheel and the right front wheel by rotating the steering shaft;
wherein the steering shaft is coupled, either directly or indirectly, to the left front wheel and to the right front wheel such that rotation of the steering shaft by the handle bars causes the left front wheel and the right front wheel to pivot.

8. The standing motorized lawn mower according to claim 7
wherein the handle bars comprises a left hand grip, a right hand grip, the processor, the touch sensitive display, the transceiver, the phone holder, the cup holder, and the earphone jack;
wherein the left hand grip projects laterally from a left side of the handle bars;
wherein the right hand grip projects laterally from a right side of the handle bars;
wherein the left hand grip and the right hand grip are adapted to held by the user while the user is riding the standing motorized lawn mower;
wherein the left hand grip and the right hand grip are operable to rotate the handle bars by pulling the left hand grip or the right hand grip towards a rear of the standing motorized lawn mower.

9. The standing motorized lawn mower according to claim 8
wherein the processor is a computer processor that incorporates functions of a central processing unit in the form of one or more integrated circuits;
wherein the processor is a multipurpose, clock driven, register based, digital-integrated circuit;
wherein the processor accepts binary data as input, process the binary data according to instructions stored in a memory, and provide results as output;
wherein the processor contains both combinational logic and sequential digital logic;
wherein the processor operates on numbers and symbols represented in the binary numeral system;
wherein the processor controls an operation of the standing motorized lawn mower.

10. The standing motorized lawn mower according to claim 9
wherein based upon inputs received from the touch sensitive display or subsystems of the mower, the processor engages and disengages the blade drive, the rear drive, and the one or more string trimmers;
wherein the processor enables and disables operation of the mower motor and controls a rotational speed of the mower motor;

wherein the processor determines the hood elevation angle;

wherein the processor controls an on/off state of the one or more headlights;

wherein the touch sensitive display is adapted to display operational status to the user and to notify the processor of input provided by the user touching the touch sensitive display.

11. The standing motorized lawn mower according to claim 10 wherein the processor displays icons, text, graphical user interface controls, touch targets, or hyperlinks representing subsystems or operational parameters;

wherein the processor interprets interactions with the touch sensitive display such as touches, dragging, tapping, or double tapping as input to modify the operation of the standing motorized lawn mower.

12. The standing motorized lawn mower according to claim 11 wherein the transceiver provides a wireless interconnection between the processor and one or more subsystems of the standing motorized lawn mower or between the processor and a smart phone;

wherein the transceiver provides one or more channels of communication using proprietary and/or industry standard protocols.

13. The standing motorized lawn mower according to claim 12 wherein the phone holder is a rectangular depression in a top surface of the handle bars that is adapted to hold the smart phone;

wherein the cup holder is a circular depression in the top surface of the handle bars that is adapted to hold a drinking cup;

wherein the earphone jack is an electrical jack that is adapted to accept a plug from an earphone;

wherein the earphone jack is electrically coupled to the processor such that an audio signal from the processor is passed to the earphone.

14. The standing motorized lawn mower according to claim 13 wherein the sulky is coupled the mower, either directly or indirectly, and is pulled by the mower;

wherein the sulky rolls over the lawn using a sulky wheels;

wherein the sulky is adapted for the user to stand on an operator platform.

15. The standing motorized lawn mower according to claim 14 wherein the operator platform pivots upwards at a platform hinge such that a footprint of the standing motorized lawn mower is reduced for storage.

16. The standing motorized lawn mower according to claim 15 wherein an individual string trimmer selected from the one or more string trimmers comprises a trimmer motor, a string spool, a trimming string;

wherein the string spool is coupled to the trimmer motor such that rotation of the trimmer motor causes rotation of the string spool;

wherein the trimming string is wrapped around the string spool such that at least one end of the trimming string is free to cut as the string spool rotates;

wherein additional length of the trimming string is fed out from the string spool as the trimming string wears during use.

17. The standing motorized lawn mower according to claim 16 wherein the one or more string trimmers are coupled to a left trimmer track and a right trimmer track;

wherein the left trimmer track and the right trimmer track are coupled to an underside of the hood at a front of the hood;

wherein the one or more string trimmers are repositioned along the left trimmer track and the right trimmer track under control of the processor to trim in front of and along a side of the mower;

wherein a height of the one or more string trimmers is varied by changing the hood elevation angle.

18. The standing motorized lawn mower according to claim 17 wherein the standing motorized lawn mower further comprises an operator seat;

wherein the operator seat comprises a seat, a seat base, and a seat post;

wherein the operator seat is attached to the operator platform by coupling the seat base to the operator platform via seat mounting hardware;

wherein the operator seat is decoupled and removed from the operator platform for standing operation;

wherein the operator seat is adapted for the user to sit upon when the operator seat is coupled to the operator platform;

wherein a height of the seat is varied by changing a height of the seat post.

19. The standing motorized lawn mower according to claim 18 wherein the standing motorized lawn mower further comprises a sun shade;

wherein the sun shade comprises a shade frame and a shade panel;

wherein the shade panel is adapted to provide shade for the user while the user operates the standing motorized lawn mower;

wherein the shade frame is adapted to support the shade panel above the user;

wherein the sun shade is attached to the operator platform by coupling the shade frame to the operator platform via shade mounting hardware;

wherein the sun shade is decoupled and removed from the operator platform by removing the shade mounting hardware.

* * * * *